J. HOFMANN.
LOCATION INDICATOR.
APPLICATION FILED NOV. 14, 1907.

909,798.

Patented Jan. 12, 1909.
5 SHEETS—SHEET 1.

WITNESSES

INVENTOR
Josef Hofmann

J. HOFMANN.
LOCATION INDICATOR.
APPLICATION FILED NOV. 14, 1907.

909,798.

Patented Jan. 12, 1909.
5 SHEETS—SHEET 2.

WITNESSES
L. H. Grote.
M. E. Keir.

INVENTOR
Josef Hofmann by Howson and Howson
attorneys

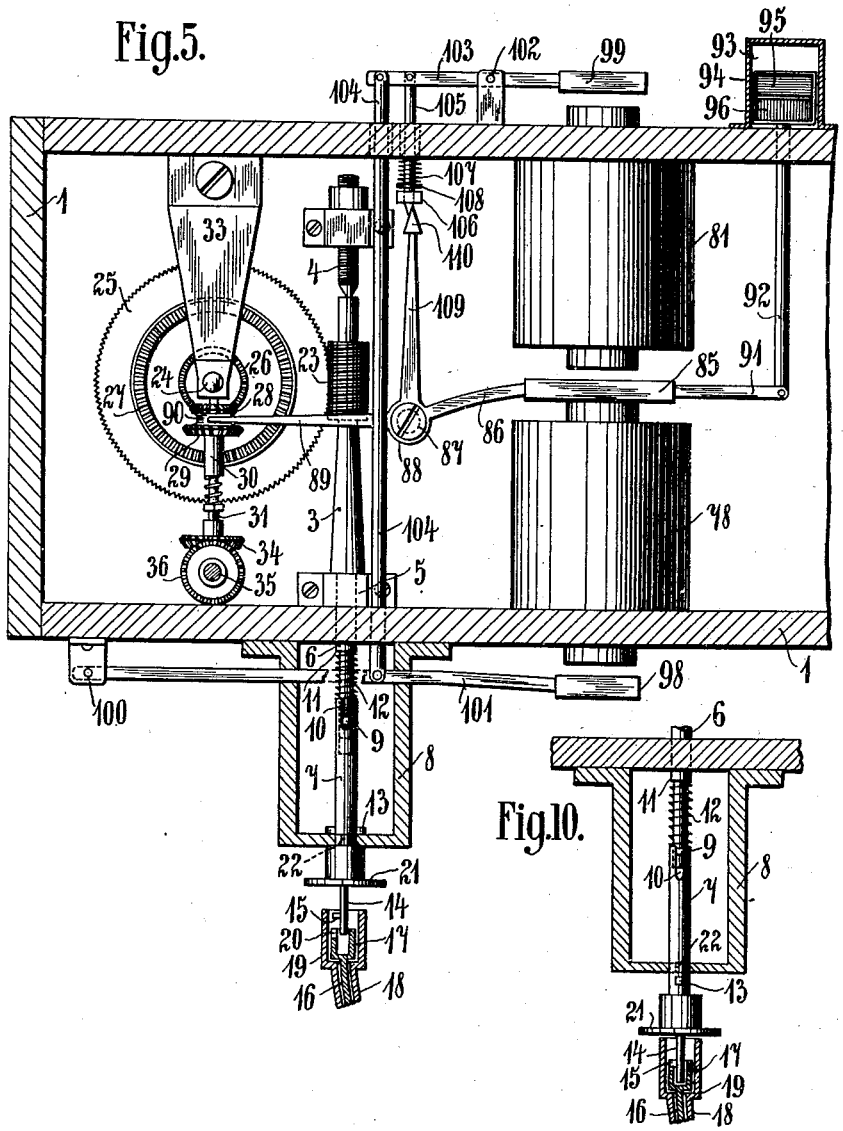

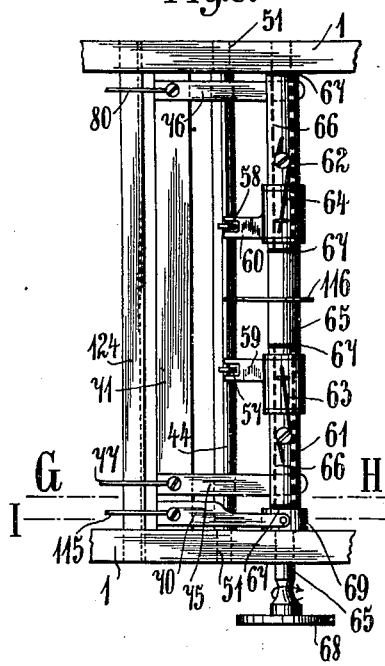

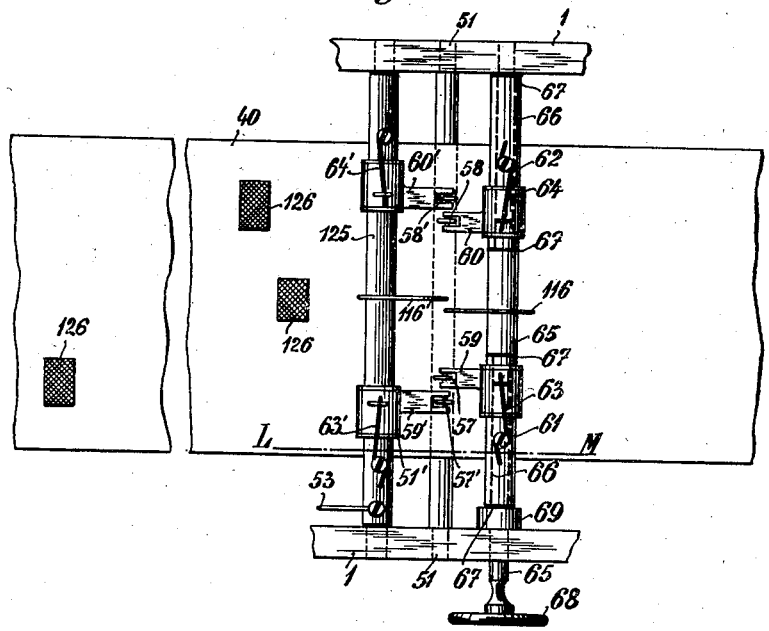
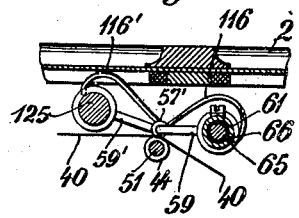

UNITED STATES PATENT OFFICE.

JOSEF HOFMANN, OF POTSDAM, GERMANY.

LOCATION-INDICATOR.

No. 909,798.　　　　Specification of Letters Patent.　　Patented Jan. 12, 1909.

Application filed November 14, 1907. Serial No. 402,081.

*To all whom it may concern:*

Be it known that I, JOSEF HOFMANN, a subject of the Emperor of Austria, residing at Potsdam, Prussia, Germany, have invented a certain new and useful Improvement in Location-Indicators, of which the following is a specification.

The present invention relates to a location indicator with a tape to be actuated by the rotation of the running wheels of the vehicle. In the location indicators hitherto known the movable tape is provided with a map or chart of the road, which is drawn at all points on a determined scale. These location indicators have the disadvantage that the scale chosen to represent the road, should it be satisfactory for distances outside of towns or villages, is, as a rule, too small within towns or villages. If, on the other hand, the scale of the chart is so chosen, that it is sufficient for distances within towns and villages, it is generally too large for distances outside of towns and villages. In order to eliminate this defect, the road map on the tape is in accordance with the present invention, divided into sections on a different scale, according whether it relates to distances within or outside of towns or villages, electric contacts being closed by the tape, as soon as a new section reaches the pointer indicating the then point of location, so that by the shifting of a variable driving gear, the speed of the tape is correspondingly varied in an automatic manner. So long, therefore, as a section of the map which represents a distance outside of a town or village and is drawn on a smaller scale moves beneath the pointer, the tape is actuated at the comparatively low speed corresponding to this scale. As soon, however, as the section of the map which represents a distance within a town or village and is drawn on a larger scale, comes beneath the pointer, the speed of the tape is increased in accordance with the scale of the new tape by the shifting of the variable driving gear electrically produced in consequence of the contact made by the tape. In a similar manner, the speed of the tape is correspondingly decreased as soon as a section of map of the smaller scale comes under the pointer, and so forth.

The subject matter of the invention is shown in the accompanying drawings, in which—

Figure 1:
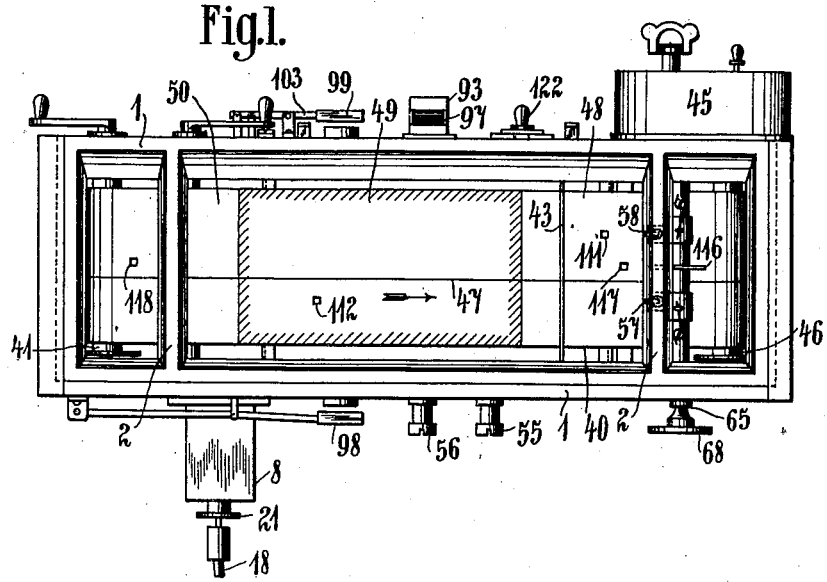
Figure 2:
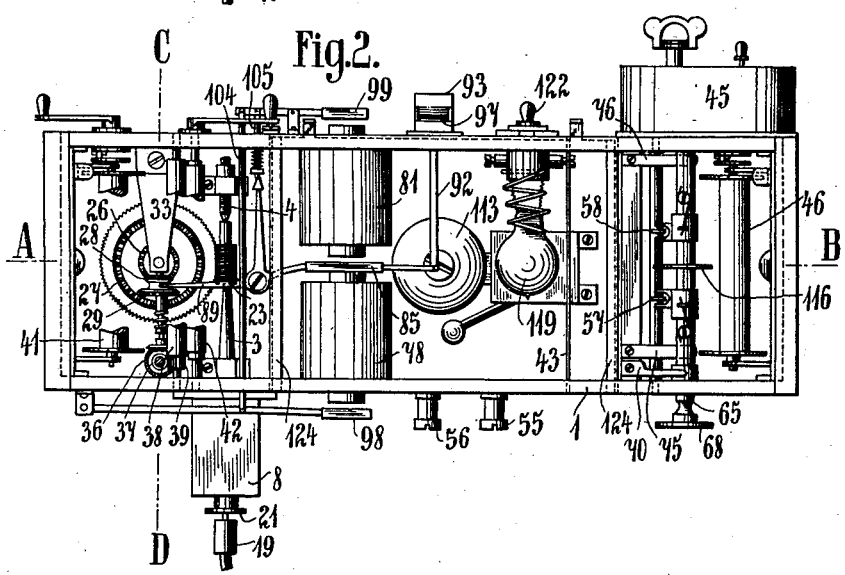
Figure 3:
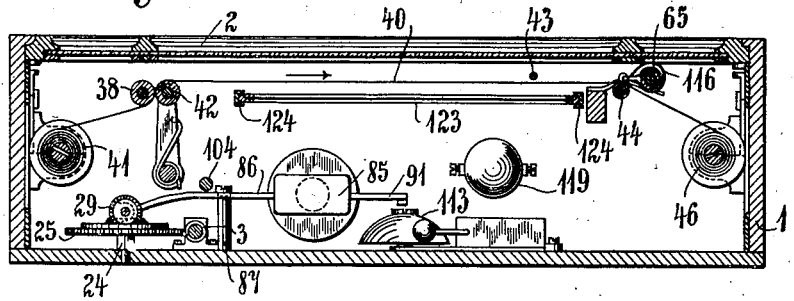
Figure 4:
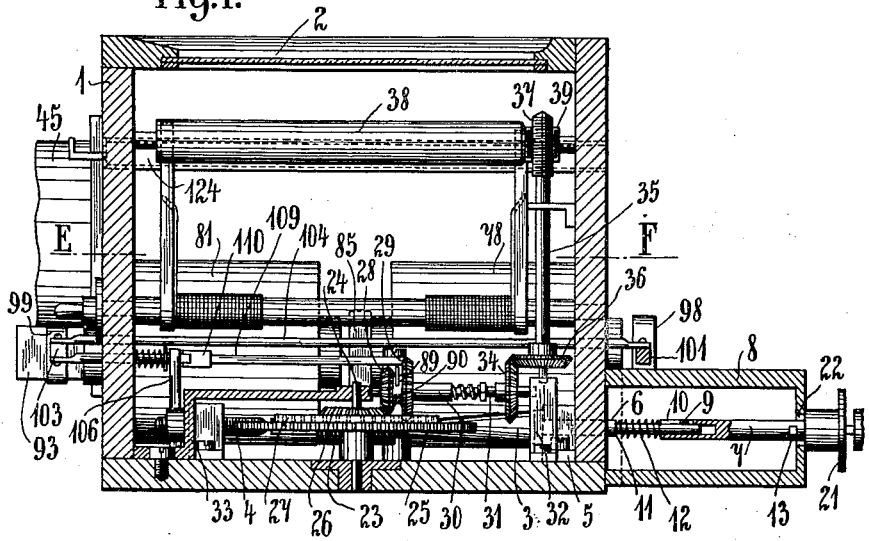

Figure 1 is a plan view of a location indicator embodying my invention; Fig. 2 is a plan view with the cover removed; Fig. 3 is a vertical longitudinal section on the line A—B of Fig. 2; Fig. 4 is a vertical transverse section on the line C—D of Fig. 2 and drawn to a larger scale; Fig. 5 is a longitudinal section on the line E—F Fig. 4; Fig. 6 is a plan view on a larger scale of a portion of the mechanism shown in Fig. 2; Fig. 7 is a section on the line G—H, Fig. 6; Fig. 8 is a section on the line I—K, Fig. 6; Fig. 9 is a diagram of the circuits; and Fig. 10 shows a detail. Fig. 11 is a plan view of a modified form of the contact device. Fig. 12 is a section on the line L—M, Fig. 11.

In the wooden box 1, Fig. 1, covered with a sliding cover 2, provided with glass plates and containing the different parts of the location indicator, there is supported a driving shaft 3, Figs. 2 and 5, by which the movement of the tape showing the map or road chart is produced in a manner to be more thoroughly described hereafter. The driving shaft 3 is supported at the one end on the point of a screw bolt 4, Fig. 5, and at the other end in a bearing 5. The end 6 of shaft 3 extends through the wall of box 1 and engages freely with the hollow in shaft 7, which has its bearings in a small casing 8 attached to box 1. On the shaft extension 6 is provided a pin 9, which continually engages in a longitudinal slot 10 in shaft 7. Thus when shaft 7 rotates, shaft 3 is carried along by the same. Between the inner end of shaft 7 and a shoulder piece 11 of the shaft extension 6 is arranged a spring 12, which tends to press shaft 7 outwardly.

Shaft 7 is provided with pins 13 opposite each other, which when the tape is at standstill are pressed by spring 12 against the interior wall of casing 8. Shaft 7 is furthermore provided with an extension 14, which has a pin 15 and engages freely with a sleeve 17 arranged on the flexible shaft 16. The flexible shaft 16 is connected in a suitable manner to one of the running wheels of the motor car, etc., to which the location indicator is attached, and is surrounded by a stationary protecting shell 18. The rotatable sleeve 17 has its bearings in a sleeve 19 attached to casing 8 and connected with shell 18. Pin 15, when the location indicator is not in operation, is disengaged from the slot 20 of the rotary sleeve 17. In order to cause this pin 15 to engage with slot 20, shaft 7 need only be turned by hand by means of the button 21 fixed to it in such a manner that the pins 13 come to lie in the direction of corresponding slots 22, Fig. 4, of casing 8. Then shaft 7 is pressed outwardly by spring 12, Fig. 10, until pin 15 engages with slot 20, so that the flexible shaft 16 is coupled with the driving shaft 3 of the gearing of the location indicator. In a similar way, shaft 3 is disconnected from the flexible shaft 16, by pressing shaft 7 inwardly by means of button 21, pins 13 being carried through the slots 22, Fig. 4, of casing 8, whereupon by turning button 21, these pins 13 are finally brought into the resting position of Fig. 5.

On shaft 3 is arranged a worm 23, Fig. 5, which engages with a worm wheel 25 on pivot 24, Fig. 4. This worm wheel 25 is provided with two sets of conical teeth 26 and 27 of a different diameter, which together with a set of beveled tooth wheels 28 and 29 represent variable driving gearing of the usual type. The beveled tooth wheels 28 and 29 are arranged on a sleeve 30 which can be displaced in the usual manner on a shaft 31 by means of a nut and spring, so that it is forced to participate in the rotation of this shaft. Shaft 31 has its bearings on the one hand in a block 32, Fig. 4, and on the other hand, in an angle piece 33, which also serves for the bearing of the upper end of pivot 24. The means for displacing the pair of wheels 28, 29, in order to alternately bring the one or the other of these wheels to engage with the corresponding set of teeth 26 or 27, are described more fully below.

To shaft 31 is fixed a beveled tooth wheel 34, which gears with a beveled tooth wheel 36 on shaft 35. Shaft 35 carries a worm 37, Fig. 4, which gears with a worm wheel 39, Fig. 2, connected with a feeding roller 38, Figs. 2, 3 and 4. The feed roller 38 serves for the movement of the tape 40, Figs. 1 and 3, which bears the map or road chart and which in the example shown, runs from the unwinding roller 41, Fig. 3, between the feeder roller 38 and a spring pressed roller 42 below a pointer of wire or thread 43, Fig. 1, and showing the respective point of location of the motor car in the map, over a contact roller 44, to be more fully described below, to a winding roller 46 operated by a clockwork 45, Fig. 2.

From the above it is clear that, as soon as, following the movement of the motor car, etc., the coupling shaft 7 is in the engaged position, the feeder roller 38, Fig. 3, will rotate at a higher or lower speed according as the variable driving gear 26—29, Fig. 5, is set, so that the tape 40 is moved along below the pointer 43, Fig. 1, at a corresponding speed by the clockwork 45, Fig. 2.

Tape 40 is provided with a map or a topographical outline of the road to be traveled. This road map is not, however, drawn all over on the same scale, as in the location indicators hitherto known, but those sections of the road map which correspond to the parts lying within the towns or villages to be passed through, are on a larger scale, for example, 1: 12500, while those sections, which correspond to the parts outside of the towns or villages, are drawn on a smaller scale, for example, 1: 25000. In Fig. 1 the road to be traversed is shown on tape 40 as a simple line 47 for the purpose of clearness. In this Fig. 1 there is directly beneath the pointer 43 a section 48, which represents a part outside of a town or village, while there lies next to this section to the left a section 49, Fig. 1, hatched at the edge and representing a part within a town or village, the road representation of which is drawn on a larger scale than that of section 48. To section 49 there is again contiguous to the left a section 50, which represents a part outside of a town or village and the road of which is drawn on the same scale as that of section 48.

The sections of tape 40 drawn on a different scale must be moved at a different speed beneath the pointer 43, Fig. 1, the sections on the larger scale, as for example section 49, having to be moved at a correspondingly higher speed than the sections on the smaller scale, as for examples sections 48 and 50. The movement of tape 40 at the required higher or lower speed is produced by a corresponding displacement of the variable driving gear 26—29, Figs. 2 and 5, this displacement being produced by tape 40 by electric means, as described hereafter.

Tape 40 runs, as previously described, over a contact roller 44, Fig. 3. This contact roller 44 is rotatable on a metallic shaft 51, Fig. 6, from which conductors 52, 53, Fig. 9, lead to the terminal connected with a battery. Against contact roller 44 are pressed the contact rollers 57, 58, Figs. 6 and 7, which however, are ordinarily kept out of contact with roller 44 by the tape 40 running between these rollers 57 and 58 and roller 44, the tape being made of paper or other insulating material. Rollers 57, 58 have their bearings on metallic arms 59, 60, which are rotatable on metal sleeves 61, 62, and are pressed against tape 40, Fig. 7, by springs 63, 64, fixed to the sleeves. Sleeves 61, 62 are arranged on a metallic shaft 65, from which they are however insulated by sleeves 66 and disks 67 of paper or similar material. Shaft 65 is capable of rotation under friction in the wooden box 1 and is provided with a ribbed button 68. Shaft 65 further has an enlargement 69, on which bears a friction contact 70. This friction contact, the purpose of which is to be explained below, is attached to a strip 71 of wood or other insulating material, and also serves to limit the rotation of shaft 65. For this purpose the friction contact is provided with a point 72, Fig. 8, which can engage with the one or the other of two notches 73, 74, of the enlargement 69. If point 72 is in notch 73, the contact rollers 57, 58, are lightly pressed against tape 40 by the springs 63, 64. In order to put rollers 57, 58 out of contact with tape 40, it is merely necessary to turn shaft 65 in the direction of the arrow by button 68, Figs. 6 and 8, until point 72 of the friction contact 70 enters notch 74.

On the insulating strip 71, Fig. 6, there are arranged besides the friction contact 70, also the friction contacts 75, 76, which bear on the sleeves 61 and 62. Friction contact 75 is connected by a conductor 77, Fig. 9, with the one end of the winding of an electromagnet 78, Figs. 2, 4 and 5, the other end of which is connected by a conductor 79, Fig. 9, with the binding post 56. The friction contact 76 is connected by a conductor 80 with the one end of the winding of the electromagnet 81, Figs. 2, 4 and 5, which lies opposite to the electromagnet 78. The other end of this winding is connected with the binding post 56 by conductors 82, 83 and 84.

Between the electromagnets 78, 81, is arranged an armature 85, Fig. 5, which can be attracted alternately by the one or the other of these electromagnets. Armature 85 is attached to arm 86 of a three-armed lever 88 pivoting about 87. Arm 89 of this three-armed lever engages with its forked end in a groove 90 located between the above described set of wheels 28, 29. As soon therefore, as armature 85 is attracted by the electromagnet 81 the beveled wheel 28 is disengaged from the teeth 26 and the beveled wheel 29 is put into engagement with the teeth 27, while when the armature 85 is attracted by the electromagnet 78 the variable driving gear 26—29 is set for the different speed.

In order that the one in charge of the motor car may at any moment be able to see whether the adjustable driving gear 26—29, Fig. 5, is set for high or for low speed, that is, whether the wheel 29 or the wheel 28 is in engagement, there is fixed to armature 85 an arm 91, which is connected by a rod 92 with a signal plate 94 movable in box 93. This signal plate 94 is provided with a blue field 95 and a red field 96. If the beveled wheel 28 is in engagement, then the blue field 95 is visible in the opening 97, Fig. 1, of the box, while if the beveled wheel 29 is in engagement, the red field 96 becomes visible in opening 97.

In the location indicator shown there is also provided a safety device, in order to prevent the set of wheels 28, 29 from being moved accidentally, by the shocks caused by the running of the motor car, from the one or the other end position, into which it was brought by the one or the other electromagnets 78 or 81, when the respective electromagnets becomes currentless. For this purpose the electromagnets 78, 81 have, besides the common armature 85 lying between them, special armatures 98 and 99, Fig. 5, which are arranged outside of the box 1. Armature 98, belonging to the electromagnet 78, is attached to a one-armed lever 101 pivotally arranged at 100, while armature 99 belonging to the electromagnet 81, is fixed to a two-armed lever 103 which turns about 102. Both levers 101, 103, are positively connected with each other by a rod 104. To lever 103 is furthermore pivotally attached a pin 105, which is guided in the wall 1 and furthermore in a fixed arm 106, Fig. 5. A spring 107 arranged on pin 105 which acts on washer 108 fixed to this pin, strives to press the latter inwardly. Pin 105 ordinarily holds an arm 109 of the above-mentioned three-armed lever 88 in a locked position in that its knife-shaped end bears either on the left or on the right side of a nosepiece 110 of arm 109. As soon as, for the purpose of changing about the driving gear 26—29, one of the electromagnets 78, 81 is excited, arm 109 is released. If, for example, in the position of the parts as in Fig. 5, electromagnet 81 is excited, it first attracts its armature 99. In consequence of this, pin 105 is pulled back, and only then can the electromagnet 81 attract the central armature 85, so that the driving gear 26—29 can be changed about, that is, the beveled tooth wheel 29 brought into engagement with the teeth 27. So long as electromagnet 81 is excited, the beveled wheel 29 is held by this electromagnet itself in engagement with the teeth 27. As soon, however, as the excitation of electromagnet 81 ceases, the armature 99 is released so that pin 105 locks arm 109, the beveled wheel 29 being then kept by this pin 105 in engagement with the teeth 27.

In a similar manner, when electromagnet 78 is excited, arm 109 is released by pin 105 by the attraction of armature 98, so that the beveled wheel 28 can be caused to engage with the teeth 26, while after the breakage of the current through the electromagnet 78 the beveled wheel 28 is kept in the engaged position by the pin 105.

The excitation of the electromagnets 78, 81, is effected automatically by tape 40, Fig. 1, as soon as a new section of the map or road chart drawn on a different scale comes beneath the location pointer 43. In the position of Fig. 1, there is beneath the pointer 43 the section 48, representing a distance outside of a town or village and drawn on a smaller scale, of the tape 40 moving in the direction of the arrow. In this case the beveled tooth wheel 28 engages with teeth 26, so that the tape 40 is actuated at low speed. As soon as, with the continued movement of tape 40, the forward end of the part 49, which in Fig. 1 is the right end, moves beneath the pointer 43, a perforation 111 provided in tape 40 comes beneath the contact roller 58, so that the same comes into contact with contact roller 44, from which it had previously been held by the tape 40. In consequence of this the following circuit is made: from the battery 54, Fig. 9, through the binding post 55, lines 53 and 52, shaft 51, contact roller 44, contact roller 58, arm 60, sleeve 62, friction contact 76, line 80, electromagnet 81 and lines 82, 83, 84 back to the binding post 56 and the battery 54. Electromagnet 81 is therefore excited, so that the armatures 85 and 99, Figs. 2 and 5, are attracted and the variable drvng gear 26—29 is so set that the beveled tooth wheel 29 engages with the teeth 27 of large diameter. Tape 40 is therefore actuated at a correspondingly increased speed while section 49 representing a distance within a town or village and drawn on a larger scale moves beneath the pointer 43. As soon as perforation 111 has been moved away from beneath contact roller 58, the contact between this roller and roller 44 is broken, so that the electromagnet 81 becomes currentless. The beveled wheel 29 is, however, as previously explained, now held in engagement with teeth 27, in that pin 105, Fig. 5, which now lies to the right side, in Fig. 5, of the nosepiece 110, holds arm 109 of the three-armed lever 88 serving to change about the variable driving gear, in a locked position.

As soon as section 49, shown on a larger scale, of tape 40 has moved away beneath pointer 43 and section 50, which again represents a distance outside of a town or village and similarly to section 48 is drawn on a smaller scale, comes beneath the pointer 43, the variable driving gear 26—29, Fig. 5, is again changed by means of the perforation 112, Fig. 1, in tape 40, which comes under the contact roller 57. Through this perforation the contact roller 57 touches contact roller 44, Fig. 6, and the following circuit is made: from the battery 54, Fig. 9, and the binding post 55, through line 53, line 52, shaft 51, contact roller 44, contact roller 57, arm 59, sleeve 61, friction contact 75, line 77, electromagnet 78, line 79, binding post 56, and back to battery 54. In consequence of this, the electromagnet 78 is excited, so that it attracts the armatures 85 and 98 and therefore again brings the beveled tooth wheel 28 of the adjustable driving gear into engagement with the teeth 26 of smaller diameter. In this manner the tape 40 is again actuated at a low speed. In the same manner, on the recurrence of a section of the tape drawn on the larger scale, followed by one on the smaller scale, the changes of the variable driving gear 26—29 is caused by perforations corresponding to the perforations 111 and 112, which as just described, establish the circuit between the contact rollers 57 or 58 and the contact roller 44. The transmission relation of the wheels of the variable driving gear and of the other wheels serving in the transmission of the movement to tape 40 is naturally so chosen that without regard to the question whether a section on the scale of 48 or 50 is actuated at a lower speed, or a section on the larger scale, such as section 49, at a higher speed, the speed of tape 40, taking into consideration the scale of the section beneath the pointer 43, always corresponds to the speed of the motor car or other similar vehicle.

In the location indicator shown there is also provided an arrangement which gives the one in control an acoustic signal, as soon as a section on the larger scale of tape 40 approaches the pointer 43, that is, as soon as the motor car has approached to within a short distance of a town or village, say about 1 kilometer. The advantage of this arrangement is found in the fact that the chauffeur is warned by this acoustic signal, that the speed of the motor car should be decreased as a town or village is being approached and that special care should be given the road. The said acoustic signal is given by an electric bell 113, Figs. 2 and 9, arranged in the box 1, and which is connected on the one hand by line 114, Fig. 9, to line 84 and binding post 56, and on the other hand, by line 115 to the friction contact 70. This friction contact 70 bears, as above stated, on an enlargement 69 of shaft 65 having its bearings in box 1 and insulated from sleeves 61, 62 and arms 59, 60. To the middle part of shaft 65 is fixed a contact spring 116, Fig. 6, which is ordinarily kept out of contact with contact roller 44 by the tape 40 and can be removed from the tape 40 similarly to the contact rollers 57, 58, by turning button 68. As soon now, for example, as the right side of section 49, Fig. 1, has come to within a short distance of pointer 43, a perforation 117 in tape 40 moves under the contact spring 116 so that the latter comes into contact with the contact roller 44 and the following circuit is made: from battery 54, Fig. 9, through the binding post 55, line 53, 52, shaft 51, contact roller 44, contact spring 116, shaft 65, friction contact 70, line 115, bell 113, lines 114 and 84, binding post 56 and back to battery 54. In consequence of this, bell 113 is caused to sound, thus announcing to the one in charge of the motor car the approach to the town or village indicated on section 49, Fig. 1.

Bell 133 may also serve to call the timely attention of the one at the wheel to dangerous points of the road, such as sharp curves, railroad crossings, etc. For this purpose there is provided in tape 40, shortly before every such point of the road chart, a perforation 118, Fig. 1, which similarly to the perforations 116 makes the circuit between the contact spring 116 and the circuit making roller 44, so that the bell is caused to sound in the manner before described.

The circuit may be completed in any other suitable manner by the tape 40 for the purpose of exciting the magnets 78, 81 and operating the bell 113. For example, tape 40 instead of being provided with perforations 111, 112, 117, 118 may have pasted on one side of it pieces of tinfoil or similar conducting material, which make the contacts. In this case the conductor 53 is not connected with the shaft 51 of the roller 44 but the latter serves only as a guide for the tape 40 and the said conductor 53 is connected with shaft 125 (Figs. 11 and 12) mounted in the casing 1. On this shaft 125 arms 59' and 60' are journaled carrying contact rollers 57' and 58' which are pressed against the tape by springs 63' and 64'. On shaft 125 is also fixed a contact spring 116' in contact with the tape. The contact rollers 57', 58' and the contact spring 116' coöperate with the contact rollers 57, 58 and the contact spring 116 in such a manner that if pieces 126 of tinfoil fixed to the upper side of the tape come in contact with the said contact elements, the circuit is closed in the same way as by the perforations 111, 112, 117, 118.

In order to illuminate tape 40 when running at night, there is arranged in box 1 an incandescent lamp 119, Figs. 2 and 9, which is connected by a conductor 120 with conductor 83 and by a conductor 121, into which is intercalated a circuit closer 122, with conductor 53. In this manner the lamp, when closing the circuit closer 122, is provded with current by battery 54 and therefore lighted up. In order to uniformly light up the tape, there is arranged between the lamp 119 and the tape 40 a transparent plate 123, Fig. 3, which may consist of a sheet of parchment stretched into a metallic frame. This plate 123 can slide in horizontal guides 124, Fig. 2, in box 1, so that it can be conveniently removed from the side of box 1, in order that the parts located beneath the same in box 1 can be reached.

I claim as my invention

1. A location indicator for automobiles and the like, comprising a moving tape road map having different sections indicated thereon in different scales, means adapted to be connected with a moving part of the vehicle for bringing successive portions of said map into the field of vision and means for varying the speed at which the tape is moved on a variation of the scale of the portion of the map within the field of vision.

2. A location indicator for automobiles and the like, comprising a moving tape road map having different sections indicated thereon in different scales, means adapted to be connected with a moving part of the vehicle for bringing successive portions of said map into the field of vision and means for automatically varying the speed at which the tape is moved on a variation of the scale of the portion of the map within the field of vision.

3. A location indicator for automobiles and the like, comprising a moving tape road map having different sections indicated thereon in different scales, a variable speed driving gear adapted to be operated from a moving part of the vehicle for moving said map across the field of vision at speeds varying with the scales of the sections thereof, and electromagnetic means automatically controlled by said tape for effecting the changes of speed in said driving gear.

4. A location indicator for automobiles and the like, comprising a moving tape road map having different sections indicated thereon in different scales, a variable speed driving gear adapted to be operated from a moving part of the vehicle for moving said map across the field of vision at speeds varying with the scales of the sections thereof, and electromagnetic means automatically controlled by said tape for effecting the changes of speed in said driving gear, in combination with means for automatically locking said speed changing mechanism in the different gear positions.

5. A location indicator for automobiles and the like, comprising a moving tape road map having different sections indicated thereon in different scales, a variable speed driving gear adapted to be operated from a moving part of the vehicle for moving said map across the field of vision at speeds varying with the scales of the sections thereof, and electromagnetic means automatically controlled by said tape for effecting the changes of speed in said driving gear, in combination with means for indicating the change of gear.

6. A location indicator for automobiles and the like, comprising a moving tape road map having different sections indicated thereon in different scales, means adapted to be connected with a moving part of the vehicle for bringing successive portions of said map into the field of vision and means for varying the speed at which the tape is moved on a variation of the scale of the portion of the map within the field of vision, in combination with means automatically controlled by the map for sounding an electric alarm, and manually operated means for preventing the completion of the electric alarm circuit.

7. A location indicator for automobiles and the like, comprising a moving tape road map having different sections indicated thereon in different scales, means adapted to be detachably connected with a moving part of the vehicle for bringing successive portions of said map into the field of vision at speeds varying with the scales of the sections thereof and means for varying the speed at which the tape is moved on a variation of the scale of the portion of the map within the field of vision.

In testimony whereof I have signed my name to this specification, in the presence of two subscribing witnesses.

JOSEF HOFMANN.

Witnesses:
 BENJ. C. FITCH,
 CHAS. SWINNEY.